United States Patent
Borgen

(10) Patent No.: US 8,222,762 B2
(45) Date of Patent: Jul. 17, 2012

(54) DIRECT-DRIVE GENERATOR/MOTOR FOR A WINDMILL/HYDROPOWER PLANT/VESSEL WHERE THE GENERATOR/MOROT IS CONFIGURED AS A HOLLOW PROFILE AND A METHOD TO ASSEMBLE SUCH A WINDMILL/HYDROPOWER PLANT

(75) Inventor: Eystein Borgen, Rådal (NO)

(73) Assignee: Sway AS, Stavanger (NO)

( * ) Notice: Subject to any disclaimer, the term of this patent is extended or adjusted under 35 U.S.C. 154(b) by 675 days.

(21) Appl. No.: 12/089,536

(22) PCT Filed: Oct. 13, 2006

(86) PCT No.: PCT/NO2006/000357
§ 371 (c)(1),
(2), (4) Date: May 29, 2008

(87) PCT Pub. No.: WO2007/043894
PCT Pub. Date: Apr. 19, 2007

(65) Prior Publication Data
US 2008/0292467 A1   Nov. 27, 2008

(30) Foreign Application Priority Data
Oct. 13, 2005   (NO) .................................. 20054704

(51) Int. Cl.
*F03D 9/00* (2006.01)
*H02P 9/04* (2006.01)
(52) U.S. Cl. .......................................... 290/55; 290/44
(58) Field of Classification Search ................ 290/44, 290/55
See application file for complete search history.

(56) References Cited

U.S. PATENT DOCUMENTS

| | | | | |
|---|---|---|---|---|
| 1,944,239 | A | * | 1/1934 | Honnef ............................ 290/55 |
| 4,025,220 | A | * | 5/1977 | Thompson et al. ............... 415/7 |
| 4,088,352 | A | * | 5/1978 | Kling ............................... 290/55 |
| 4,168,439 | A | * | 9/1979 | Palma ............................. 290/44 |
| 4,289,970 | A | * | 9/1981 | Deibert .......................... 290/44 |
| 4,330,714 | A | * | 5/1982 | Smith ............................. 290/55 |
| 4,547,124 | A | * | 10/1985 | Kliatzkin et al. ............... 416/86 |
| 4,720,640 | A | * | 1/1988 | Anderson et al. ............... 290/43 |
| 4,832,569 | A | * | 5/1989 | Samuelsen et al. ............. 416/17 |
| 5,315,159 | A | * | 5/1994 | Gribnau ......................... 290/55 |
| 5,495,221 | A |   | 2/1996 | Post ............................... 335/299 |
| 5,765,990 | A | * | 6/1998 | Jones ............................. 415/2.1 |
| 6,064,123 | A | * | 5/2000 | Gislason ........................ 290/55 |
| 6,111,332 | A | * | 8/2000 | Post ............................... 310/90.5 |
| 6,375,424 | B1 |   | 4/2002 | Scarpa ............................ 416/4 |

(Continued)

FOREIGN PATENT DOCUMENTS

DE   3403769   8/1985

(Continued)

*Primary Examiner* — Pedro J Cuevas
(74) *Attorney, Agent, or Firm* — Christian D. Abel

(57) ABSTRACT

A turbine rotor for a wind power plant or a hydropower plant with a direct-drive generator for converting the energy in flowing wind or water into electrical energy wherein the wind or hydropower plant comprises a turbine rotor and a stator and wherein the turbine rotor further comprises a ring-shaped hub (6) having an axis of rotation that coincides with the center axis of the stator and wherein the turbine rotor comprises at least one rotor blade, which rotor blade is arranged on the ring-shaped hub. The turbine rotor is also intended to be used as a propeller for a craft.

28 Claims, 12 Drawing Sheets

U.S. PATENT DOCUMENTS

| | | | | |
|---|---|---|---|---|
| 6,648,589 | B2* | 11/2003 | Williams | 415/1 |
| 6,657,344 | B2* | 12/2003 | Post | 310/90.5 |
| 6,867,520 | B2* | 3/2005 | Jennings | 310/90.5 |
| 6,911,741 | B2 | 6/2005 | Pettersen et al. | 290/44 |
| 7,042,109 | B2* | 5/2006 | Gabrys | 290/44 |
| 7,071,578 | B1 | 7/2006 | Shibata et al. | 290/55 |
| 7,186,083 | B2* | 3/2007 | Bayly | 416/51 |
| 7,215,038 | B2* | 5/2007 | Bacon | 290/55 |
| 7,345,377 | B2* | 3/2008 | Bacon | 290/55 |
| 7,358,624 | B2* | 4/2008 | Bacon | 290/55 |
| 7,382,332 | B2* | 6/2008 | Essig et al. | 343/878 |
| 7,410,123 | B2* | 8/2008 | Nunnally | 244/23 C |
| 7,417,334 | B2* | 8/2008 | Uchiyama | 290/55 |
| 7,425,774 | B2* | 9/2008 | Shibata et al. | 290/55 |
| 7,592,712 | B2* | 9/2009 | Perlo et al. | 290/55 |
| 7,612,735 | B2* | 11/2009 | Essig et al. | 343/915 |
| 7,825,532 | B1* | 11/2010 | Barber | 290/55 |
| 2001/0036565 | A1* | 11/2001 | Jennings | 429/10 |
| 2003/0042812 | A1* | 3/2003 | Post | 310/90.5 |
| 2004/0041409 | A1* | 3/2004 | Gabrys | 290/55 |
| 2004/0066094 | A1* | 4/2004 | Suzuki et al. | 307/18 |
| 2004/0069901 | A1* | 4/2004 | Nunnally | 244/34 R |
| 2004/0207566 | A1* | 10/2004 | Essig et al. | 343/878 |
| 2005/0155450 | A1* | 7/2005 | Jennings | 74/572.12 |
| 2005/0200134 | A1* | 9/2005 | Shibata et al. | 290/55 |
| 2005/0200135 | A1* | 9/2005 | Shibata et al. | 290/55 |
| 2005/0207889 | A1* | 9/2005 | Shibata et al. | 416/132 B |
| 2005/0207890 | A1* | 9/2005 | Shibata et al. | 416/132 B |
| 2006/0033674 | A1* | 2/2006 | Essig et al. | 343/912 |
| 2007/0040385 | A1* | 2/2007 | Uchiyama | 290/44 |
| 2008/0042504 | A1* | 2/2008 | Thibodeau et al. | 310/90.5 |
| 2008/0122308 | A1* | 5/2008 | Mleux | 310/90.5 |
| 2008/0253889 | A1* | 10/2008 | Krivcov et al. | 416/44 |
| 2009/0001731 | A1* | 1/2009 | Perlo et al. | 290/55 |
| 2009/0169379 | A1* | 7/2009 | McClintic | 416/31 |
| 2009/0290972 | A1* | 11/2009 | Farb | 415/4.3 |
| 2010/0052325 | A1* | 3/2010 | Perner et al. | 290/52 |
| 2010/0111689 | A1* | 5/2010 | Davis | 415/229 |
| 2010/0126374 | A1* | 5/2010 | Ji | 104/282 |
| 2010/0133838 | A1* | 6/2010 | Borgen | 290/52 |
| 2010/0148515 | A1* | 6/2010 | Geddry et al. | 290/55 |
| 2010/0264667 | A1* | 10/2010 | Barber | 290/55 |
| 2011/0031760 | A1* | 2/2011 | Lugg | 290/55 |
| 2011/0120108 | A1* | 5/2011 | Garmong | 60/398 |
| 2011/0140451 | A1* | 6/2011 | Sharples et al. | 290/55 |
| 2011/0142683 | A1* | 6/2011 | Sharples et al. | 416/244 R |
| 2011/0193349 | A1* | 8/2011 | Borgen et al. | 290/55 |
| 2011/0309625 | A1* | 12/2011 | Dehlsen et al. | 290/55 |

FOREIGN PATENT DOCUMENTS

| | | |
|---|---|---|
| DE | 3638129 | 5/1988 |
| DE | 19711869 | 9/1998 |
| DE | 10238017 | 4/2003 |
| DE | 10255745 | 6/2004 |
| EP | 1207299 | 5/2002 |
| EP | 1861619 | 9/2006 |
| WO | 96/29774 | 9/1996 |
| WO | 99/37912 | 7/1999 |
| WO | 00/60719 | 10/2000 |
| WO | 01/06623 | 1/2001 |
| WO | 02/099950 | 12/2002 |

* cited by examiner

A-A

A-A

A-A

A-A

DIRECT-DRIVE GENERATOR/MOTOR FOR A WINDMILL/HYDROPOWER PLANT/VESSEL WHERE THE GENERATOR/MOROT IS CONFIGURED AS A HOLLOW PROFILE AND A METHOD TO ASSEMBLE SUCH A WINDMILL/HYDROPOWER PLANT

The present invention relates to a wind power plant having a direct-drive generator where the rotor turbine is supported on the stator, and a method for assembling the generator rotor and generator.

The invention relates to a large-diameter ring-shaped rotor hub consisting of a closed torsion-proof profile on which the rotor blades are arranged. The rotor hub is at the same time provided with a magnetically stable bearing which takes up axial forces. The invention can be used both for generating energy and as a propulsion system in an environment consisting of air or water.

The development of windmills or wind turbines for generating power, preferably in the form of electric power, has steadily moved in the direction of larger mills. Windmills with an output of about 5 MW and a rotor diameter of more than 115-125 m have now been designed and constructed. Windmills as large as 5 MW and more are designed primarily with a view to being installed offshore owing to the difficulties of transporting such large mills on land. The principles of these horizontal-axis windmills are virtually the same as those of their smaller sisters. They are based on a rotor consisting of typically three blades mounted on a central hub with shaft, the shaft being secured by a heavy-duty ball bearing. The hub must be dimensioned to withstand substantial bending moments due to both the wind forces on each individual blade in the wind direction and the dead weight of each blade in a plane substantially at right angles to the wind with constantly varying direction depending on whether the blade is on its way up or down in its rotational path. If each blade has a different load from the wind at a given instant, a moment will be produced which will try to turn the hub about an axis at right angles to the longitudinal axis of the shaft. This moment can in extreme cases be exceptionally large and the shaft must also be dimensioned to withstand such a moment. The central hub and the shaft also transfer the torque of the rotor directly or via a gear to the generator.

Maintenance costs for offshore windmills are initially greater than for land-based windmills. An interruption in the energy production as a consequence of a fault in many cases also has greater consequences offshore because the weather conditions often do not permit boarding of the windmills to carry out the necessary repairs. Far out at sea, the wind conditions are also as a rule considerably stronger than on land. If it is desired to harvest as much of this energy as possible by increasing the nominal wind speed at which the blades are turned out of the wind, the wind power plant will be subjected increased fatigue loads compared to a location in calmer wind conditions.

Large windmills or wind turbines have the advantage that maintenance and "one-off costs" such as control systems etc. per kWh of produced energy unit can be expected to be reduced. The disadvantage is that weight and material consumption increase per kWh of power produced in the case of such large mills. The optimal economic size of a land-based windmill is with today's technology estimated by many to be about 1-3 MW.

The reason that weight and material consumption increase per produced energy unit with the increasing size of the windmill is that the weight increases approximately by the third power of the longitudinal dimension (volumetric increase) whilst the sweep area of the rotor (defined as the area of the circle that encircles the rotor blades as they rotate), and thus the energy production, only increases by the square of the longitudinal dimension. This implies a comparison of a given location where the wind strength is the same in both cases. I.e., if it is desired to increase the size of the windmill whilst using the same technology as before, the weight per energy unit produced, and thus to a great extent the costs, will increase approximately linearly with the size of the windmill.

In addition, the rotational speed (angular velocity) will be reduced with increasing windmill rotor diameter. This is because the optimal blade tip speed is given as a function of the wind speed. The optimal ratio between blade tip speed and wind speed, hereafter referred to as the tip speed ratio, will, for a three-bladed windmill, normally be in the order of 6 depending on the length/breadth ratio of the blades. When the wind speed is the same, the angular velocity of the rotor will therefore decrease for a windmill with larger rotor diameter. The output produced, if losses are disregarded, is the product of the angular velocity of the rotor and the torque of the rotor; $P=M_T*\omega$, wherein P is output, $M_T$ is torque and $\omega$ is angular velocity.

The increase in the torque which must be transferred from the aerodynamic rotor via the drive gear to an electrical generator when the power is increased by increasing the rotor diameter can then be estimated by the following considerations:

$$P=Cp*\rho*v^3*A=Cp*\rho*v^3*D^2*\pi/4,$$

wherein Cp is a constant, $\rho$ is the density of the liquid or air, v is wind speed, A is the swept rotor area and D is the rotor diameter and $$\omega=v*6/(D*\pi)*2*\pi=12*v/D,$$

wherein 6 is the tip speed ratio.

Inserting for P and $\omega$ in the formula $P=M_T*\omega$ gives:

$$M_T=Cp*\rho*v^3*D^2*\pi*D/(4*12*v)=Cp*\rho*v^2*D^3*\pi/48$$

$$M_T=k*D^3,$$

wherein k is constant for a given wind speed and air density.

Thus, like the weight of the rotor, the torque transferred from the rotor via the drive gear to the generator will increase by the third power of the rotor diameter whilst the output only increases by the square of the rotor diameter. This also means that the transmission (gearbox) is subjected to disproportionately large loads in the case of large windmills, and it will be an advantage to have a direct-drive solution. One problem is that the rotational speed is low in the case of large rotor diameters as described above, and there is instead a disproportionately large increase in necessary active material in the actual generator part for a direct-drive windmill with large rotor diameter. In addition, for direct-drive windmills it is difficult with today's technology to control the air gap between the stator and the electrical rotor part, which normally must be kept within +/− a couple of mm, owing to deflections of the main shaft.

The conditions described above illustrate the problem of increasing the rotor diameter of a windmill in order to increase output. Weight, and thus to a great extent the costs per kWh produced for a windmill in the megawatt class increases approximately linearly with the rotor diameter, which speaks against building larger windmills using today's known technology. In addition, air gap tolerances between stator and the electrical rotor are a problem for larger direct-drive generators. Fatigue in the blades and tower structure as a result of varying wind speeds are also a problem, in particular for floating installations.

The conditions mentioned above represent the most significant limitations for constructing windmills offshore that are substantially larger than 3-5 MW.

Of prior art in the field, mention can be made of U.S. Pat. No. 6,285,090 which teaches a direct-drive wind turbine (without a gear) where the diameter of the hub is relatively large but which will have a substantial weight in order to be capable of taking up the loads from the rotor blades. The ball bearing between the fixed shaft and the rotating part is also large and will be subject to substantial wear and a need for lubrication and maintenance.

In U.S. Pat. No. 6,911,741 the problem with small tolerances in the air gap between the stator and the electrical rotor are described.

WO 02/099950 A1 teaches a turbine with a direct-drive generator, wherein the stator wheel and the rotor wheel are made according to the same principle as a bicycle wheel with spokes which at one end are fastened to an outer ring or rim and at the other end are fastened eccentrically to the hub. In this way, it takes up both radial and to a certain extent axial forces.

DE 36 38 129 A1 teaches a wind power plant having a ring generator, wherein the rotor ring of the generator is fastened to the tips of the wind turbine rotor. The wind turbine rotor and the rotor ring of the generator are supported on a magnetic bearing.

DE 197 11 869 A1 teaches a wind turbine with a hollow hub. The hub is split into two L-shaped parts, wherein one of the L-shaped parts is arranged on the tower and wherein the turbine blades are arranged on the other L-shaped part. The second L-shaped part is supported on the first L-shaped part by means of a bearing.

In the present application the term "turbine rotor" is used as a collective term for the rotating unit on a wind or hydropower plant which converts the energy in the water or the wind into mechanical energy that in turn is converted into electrical energy in the generator. The generator rotor where the magnets are mounted is also referred to as the electrical rotor. "Turbine rotor" is also used to refer to the rotor of the propulsion machinery.

By the "active parts" of the generator is meant the parts which contribute to the energy conversion in the wind power plant.

By "ironless principles" is meant, in this invention, structural principles for generators which do not utilise ferromagnetic materials to conduct magnetic fields.

In the development of the present invention it has been an object to construct a cost-efficient integrated rotor and generator for wind power plants in the 5-15 MW class with a substantial increase in rotor diameter, and thus energy production, without an increase in the weight of blades and hub and without the torque causing larger forces in the structure per kWh of energy produced.

It has also been an object that parts of the invention should be suitable for use in hydropower production, tidal water power and/or propulsion systems for boats and ships (where the rotor is used as a propeller).

These objects are achieved with the present invention as disclosed in the independent claims. Alternative embodiments are disclosed in the dependent claims which are associated with each independent claim.

With the present invention, the following advantages are obtained:

1) Substantial increase in the swept area of the rotor (and thus energy production) without increasing the length and weight of the rotor blades;
2) Dramatic increase in the diameter of the hub whilst its weight is decreased;
3) Small torsional stresses (about the axis of rotation) in the hub and shaft owing to large hub diameter;
4) Direct drive allowing the omission of a transmission unit (gear) and at the same time an increase in peripheral speed between the stator and the electrical rotor (the magnets) and thus a smaller requirement for active material in the generator;
5) Larger air gap tolerance between the stator and the electrical rotor so that this is no longer a critical parameter;
6) Direct air cooling without any need for pump systems for circulation of coolant;
7) No contact between moving parts in the main bearing or generator during operation so that wear and maintenance are substantially reduced;
8) Over 50% reduction of total weight of the rotor and generator compared with the scaling up of prior art for a 5 MW wind turbine to 10 MW.

According to a first aspect of the invention, a turbine rotor is provided for a wind power plant or a hydropower plant having a direct-drive generator for converting the energy in the wind or the water into electrical energy, wherein the wind or hydropower plant comprises a turbine rotor and a stator, the turbine rotor further comprising a ring-shaped hub with an axis of rotation that coincides with the centre axis of the stator and wherein the turbine rotor comprises at least one rotor blade, the said rotor blade being arranged on the ring-shaped hub.

Advantageously, the ring-shaped hub comprises the generator rotor (the electrical rotor).

Furthermore, it is advantageous if the generator rotor is mounted to the ring-shaped hub.

The ring-shaped hub is advantageously configured as a torus with a closed circular cross-section, or approximately circular cross-section, but may also be configured as a torus with a closed polygonal cross-section.

A section through the ring-shaped hub perpendicular to the axis of rotation of the wind turbine rotor is advantageously ring-shaped, where the outer and inner circumferences of the ring are circular, but the section may also be ring-shaped, where the outer and inner circumferences of the ring are polygonal.

Advantageously, the distance from the axis of rotation of the turbine rotor to the outer circumference of the ring-shaped hub around the axis of rotation of the turbine rotor is at least $\frac{1}{12}$ of the radius of the turbine rotor from the axis of rotation to a blade tip.

In one embodiment, the ring-shaped hub is supported against the stator by a magnetic bearing. This magnetic bearing may be a passive magnetic bearing or an electromagnetic bearing, but may also be a conventional bearing.

In a preferred embodiment, the ring-shaped hub is supported by a magnetic bearing axially against the stator in order to take up global bending moments (caused by different wind pressure on each rotor blade) and axial forces and that the ring-shaped hub is supported radially by means of a conventional bearing which takes up radial forces.

In order to take up the radial forces, the wind turbine rotor could comprise at least two tension rods or at least two pressure rods which at their first ends are fastened to a bearing that is coaxial with the centre axis of the stator, and at their second ends are fastened to the ring-shaped hub. These tension or pressure rods lie preferably in one and the same plane.

In a preferred embodiment of the invention, the shortest distance from the axis of rotation of the ring-shaped hub to the area centre of the force transferring face of the magnetic bearing is smaller than the distance from the axis of rotation of the ring-shaped hub to the neutral axis for torsion of the cross-section of the ring-shaped hub. Such a positioning of the magnetic bearings means that displacements of the rotor part of the magnetic bearing in an axial direction counteract each other because of bending and torsion in the ring-shaped hub caused by the wind forces on the rotor. Local bending of the hub around each blade draws the bearing locally in the direction of the wind, whilst torsional twisting of the hub cross-section causes the bearing to be displaced against the direction of the wind. When ideally positioned (angle α in FIG. 8), axial displacements of the magnetic bearing which is connected to the hub can neutralize each other wholly or partly. This is an advantage so that the magnetic bearing faces are maintained as level (plane) as possible, thereby ensuring that they do not come into contact with each other locally owing to deflections of the hub.

In one embodiment, the bending stiffness of the ring-shaped hub for bending out of a plane that is perpendicular to the axis of rotation of the ring-shaped hub is greater than the bending stiffness of the stator for bending out of the same plane. In a preferred embodiment, the bending stiffness of the ring-shaped hub for bending out of a plane that is perpendicular to the axis of rotation of the ring-shaped hub is at least twice as great as the bending stiffness of the stator for bending out of the plane.

According to a second aspect of the present invention, there is provided a wind or hydropower plant for conversion of the energy in flowing wind or water into electrical energy. A hydropower plant in this definition may also be a tidal water power plant or a river power plant.

According to a third aspect of the present invention, there is provided a turbine rotor for propulsion machinery with a direct-drive motor for conversion of electrical energy into kinetic energy, the propulsion machinery comprising a turbine rotor and a stator, wherein the turbine rotor comprises a ring-shaped hub (6) having an axis of rotation that coincides with the centre axis of the stator, and wherein the turbine rotor comprises at least one rotor blade, the said rotor blade being arranged on the ring-shaped hub consisting of a closed hollow profile.

According to a fourth aspect of the present invention, a craft is provided comprising propulsion machinery wherein the propulsion machinery comprises a turbine rotor.

According to a fifth aspect of the present invention, there is provided a wind or hydropower plant having a direct-drive generator for conversion of wind energy into electrical energy, wherein the wind power plant comprises a stator and a turbine rotor, the said turbine rotor comprising an electrical generator, where either the electrical generator or the stator or both the electrical generator and the stator are provided with energy producing units where the turbine rotor is supported on the stator by a magnetic bearing and that the windings in the energy producing units are constructed with ironless cores.

Advantageously, the turbine rotor comprises a ring-shaped hub, the said ring-shaped hub being supported on the stator by a magnetic bearing.

Advantageously, the generator's electrical rotor is mounted to the ring-shaped hub. The ring-shaped hub is advantageously configured as a torus with a circular cross-section, but may also be configured as a torus with a polygonal cross-section.

A section through the ring-shaped hub perpendicular to the axis of rotation of the wind turbine rotor is advantageously ring-shaped, where the outer and inner circumferences of the ring are circular, but the section may also be ring-shaped, where the outer and inner circumferences of the ring are polygonal.

Advantageously, the distance from the axis of rotation of the turbine rotor to the outer circumference of the ring-shaped hub is at least $1/12$ of the turbine rotor radius from the axis of rotation to a blade tip.

In one embodiment, the ring-shaped hub is supported on the stator by a magnetic bearing. This magnetic bearing may be a passive magnetic bearing, an electromagnetic bearing or a conventional bearing.

In a preferred embodiment, the ring-shaped hub is supported by a magnetic bearing axially against the stator to take up bending moments and axial forces and the ring-shaped hub is supported radially by a conventional bearing which takes up radial forces.

In order to take up the radial forces, the wind turbine rotor can comprise at least two tension rods or at least two pressure rods which at their first ends are fastened to a bearing that is coaxial with the centre axis of the stator, and at their second ends are fastened to the ring-shaped hub. These tension or pressure rods lie preferably in one and the same plane so that axial forces or bending moments are not transferred to the radial bearing and its shaft.

In a preferred embodiment of the invention, the shortest distance from the axis of rotation of the ring-shaped hub to the area centre of the force transferring face of the magnetic bearing is smaller than the distance from the axis of rotation of the ring-shaped hub to the neutral axis of the cross-section of the ring-shaped hub. Such a positioning of the magnetic bearings means that displacements of the rotor part of the magnetic bearing in the axial direction counteract each other because of bending and torsion in the ring-shaped hub caused by the wind forces on the rotor. Local bending of the hub around each blade then draws the bearing locally in the direction of the wind, whilst torsional twisting of the hub cross-section causes the bearing to be displaced against the direction of the wind. When ideally positioned (angle α in FIG. 8), axial displacements of the magnetic bearing that is connected to the hub will cancel each other out wholly or partly. This is an advantage so that the magnetic bearing faces are kept as flat (plane) as possible thereby ensuring that they do not come into contact with each other locally owing to deflections of the hub.

In one embodiment, the bending stiffness of the ring-shaped hub for bending out of a plane which is perpendicular to the axis of rotation of the ring-shaped hub is greater than the bending stiffness of the stator for bending out of the same plane. In a preferred embodiment, the bending stiffness of the ring-shaped hub for bending out of a plane which is perpendicular to the axis of rotation the ring-shaped hub, is at least twice as great as the bending stiffness of the stator for bending out of the same plane. This means that the magnetic bearing has a local flexibility and the stator can be deflected locally if magnets in an area of the magnetic bearing approach contact with each other.

According to a sixth aspect of the present invention, there is provided a method for assembling an electrical rotor and a stator with stator windings in a direct-drive generator on a wind or hydropower plant, wherein the wind or hydropower plant further comprises a turbine rotor, the said turbine rotor comprising a ring-shaped hub and wherein the turbine rotor is supported on the stator by a magnetic bearing, which magnetic bearing is arranged on the stator and the electrical generator, which electrical generator is adapted to be able to be mounted to the ring-shaped hub of the turbine rotor, wherein the following steps are carried out during the assembly:

the electrical rotor and the stator with the stator windings are produced in a number of sections under controlled conditions in a workshop;

corresponding sections of the electrical rotor and the stator with stator windings are mounted together under controlled conditions in a workshop;

the assembled sections of electrical rotors and stators with stator windings are mounted into one unit on the wind power plant.

When the corresponding sections of the assembled sections of electrical generator units and stator windings have been mounted together in the workshop, they are transported to the location of the wind power plant before they are mounted into one unit.

The assembled sections are mounted against the ring-shaped hub of the wind turbine rotor and the stator ring of the stator.

During mounting, one section at a time is mounted to either a stator ring and then to the ring-shaped hub or in the reverse order.

On mounting, each individual section is preferably adjusted in the plane so that the finally mounted unit of sections lies in a perfect or near perfect plane. In this way, it is possible to compensate for irregularities in the ring-shaped hub and the stator ring which will often not be completely plane and might therefore have caused problems for the magnetic bearing and the electrical generator.

When the invention is taken into use in connection with a wind power plant, it will be equipped with a large ring-shaped hub where the ring that forms the hub has a diameter in the order of 10-20% of the rotor's diameter. The cross-section of the ring has a diameter in the order of the diameter of the blades at their attachment to the hub. One or more rotor blades are arranged against the ring-shaped hub. Since the rotor blades are terminated far out from the axis of rotation of the turbine rotor, the bending moments at the root of the blade are considerably smaller than for windmills having traditional hubs with corresponding rotor area. The hub consists of a ring-shaped hub which is designed to take up large torsional moments and bending moments simultaneously. That means to say that the dead weight of the blades is transferred as bending moment in the ring-shaped hub, whilst the bending moment that arises at the root of the blades owing to the wind forces is transferred as a torsional moment in the ring-shaped hub. The torque $M_T$ of the rotor which causes energy production is taken up directly in the stator without passing via a central shaft. The shaft in this patent application is therefore identical with the generator's stator and consists of a short annular ring with a large peripheral diameter, adapted to the peripheral diameter of the hub, arranged directly against the motor housing or supporting structure of the wind power plant. This means that the traditionally large torsional stresses $M_T$ in the shaft, caused by the torque of the rotor, are substantially reduced and in practice eliminated as a problem.

The main bearing of the wind power plant, which is identical with the bearing of the electrical generator, consists in the present invention preferably of a stable magnetic bearing at the periphery of the hub.

The bearing may further consist of a magnetic axial bearing at the periphery of the hub combined with a radial mechanical bearing. In that case, the magnetic bearing will be mounted between the ring-shaped hub and the stator ring where the axial forces are taken up, whilst the radial forces are taken up by arranging a spoke system between the ring-shaped hub and a mechanical bearing arranged against the fixed structure of the windmill in the centre of the axis of rotation.

Optionally, a purely magnetic bearing can be used that takes up both axial and radial forces by using a Halbach array. According to Earnshaw's theorem, it is not possible to obtain a magnetically stable bearing solely by using permanent magnets (if superconductivity under extremely low temperatures is not used). This is described in more detail in U.S. Pat. Nos. 6,111,332 and 5,495,221. To circumvent Earnshaw's theorem about magnetic instability, either a passive magnetic bearing as described in the aforementioned two patents with a so-called Halbach array can be used for support of the hub, or optionally an active electromagnetic bearing with active servo control in order to obtain magnetic stability and damping. A hybrid solution with both permanent magnets and an active electromagnetic bearing with active servo control can also be used for support of the hub.

Alternatively, the hub may be equipped with a stable, passive magnetic bearing with the permanent magnets organised in a Halbach array, or optionally a similar configuration, which both has the function of a bearing for the hub and at the same time contains the active parts of the generator, i.e., magnets and electrical conductors in a direct-drive generator.

In both of the above cases, the electrical windings in the stator are preferably ironless (without a ferromagnetic core) in order to avoid substantial magnetic attraction forces in the generator. The generator stator contains both electrical windings for electric power production and optionally (when using a solely magnetic support with a Halbach array) electrical windings as a part of the magnetic bearings.

The same windings may optionally both have an electric power producing function and at the same time form wholly or partly the electrical windings which are required in the magnetically stable bearing.

The electrical windings in the stator are, as stated above, preferably ironless, but may contain iron in areas along the stator where such an extra magnetic attraction force is desired. For an alternative described above, the passive stable bearing consists of powerful permanent magnets arranged in a special system (Halbach array or similar system) on the hub or directly on the electrical rotor and electrical conductors which are arranged on the stator. When the magnets are set in motion, a current is produced in the electrical conductors which repels the magnets in the electrical rotor. The magnets are so positioned in 2 or 3 rows in the electrical rotor that the system is stable against both axial and radial external forces. There is further provided a mechanical support which supports the rotor until it has reached a sufficient speed for the magnetic bearing to become active. This will also be necessary in the cases where an electromagnetic bearing is used in the event of cuts in the power supply or faults in the servo control system. Rubber or other damping material with good damping properties can be used in connection with the attachment of the magnets to the structure in order to increase the damping properties of the magnetic bearing as described.

The closer the magnets are to the electrical conductors, the larger the repelling forces will be. By arranging the magnets in the electrical rotor in a Halbach array, it is possible to circumvent Earnshaw's theorem of magnetic instability and nevertheless obtain a magnetically stable bearing both radially and axially. The air gap may, for a generator based on the principles of an ironless Halbach array, be increased from a couple of mm to more than 20 mm in relation to known windmill technology where iron cores are used in the stator windings. Thus, according to the invention it is possible simultaneously to ease building and bending tolerances for the supporting structural parts of the generator in the wind power plant, which in connection with the prior art is a problem area, especially for large diameter wind power generators.

Strong permanent magnets are commercially available today, for example neodymium magnets, with a magnetic force of up to 50 tonnes per $m^2$ active face. Such magnets will be sufficient to take up all the relevant dimensioning forces in the bearings described for the rotor of the wind power plant. It is an advantage that the hub is of a large diameter according to this patent so that the moment arms are large in order to withstand different loads on the rotor, such as different distribution of wind forces on the different blades.

The hub with the electrical rotor and magnetic bearing and the stator may also be equipped with cooling ribs for direct air cooling from the air stream which passes through the central part of the open hub seen in the wind direction. The stator windings will preferably be embedded in a composite stator part without an iron core. This can advantageously be perforated so that water, oil, air or another suitable coolant can circulate around the stator windings. Optionally, natural circulation of air through such cooling holes may be sufficient cooling of the stator and/or if they are arranged on the electrical rotor also of the magnets in the rotor.

It will be possible to arrange the generator with the magnetic bearing inversely to the arrangement that has been described above. The magnets will then be in the stator and the electrical windings in the rotor. In that case, the electric power must be brought back to the rest of the wind power plant through electrical slip rings.

Coaxial with the centre of the circular hub, there is provided (not shown) a slip ring bearing which transfers necessary electric power to the rotor for pitch control motors, lights etc. In addition, electrical contact is provided between the rotor and the nacelle/tower for discharge current in connection with strokes of lightning. This contact may either be a slip contact or an open contact also coaxial with the centre of the circular hub with a small aperture across which a lightning stroke will be able to jump in a light arch (not shown).

Presented below is a description of a non-limiting example of a preferred embodiment of the invention that is illustrated in the attached drawings, wherein:

FIG. 1 shows a wind power plant with a wind turbine rotor consisting of rotor blades and hub. The wind power plant is mounted on a tower 7. The tower may either have a fixed foundation or be installed floating offshore.

Figure 1:
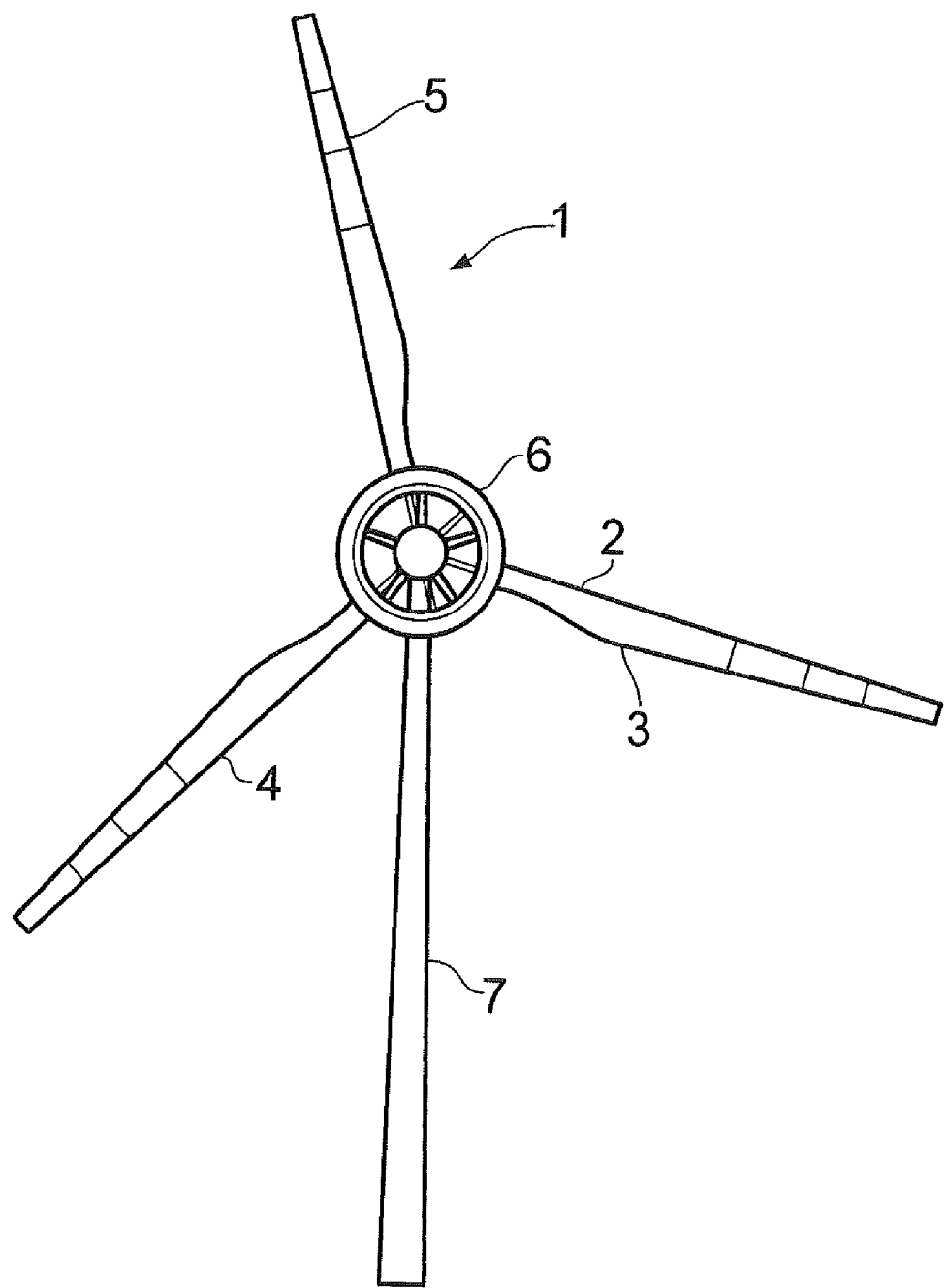
Figure 2:
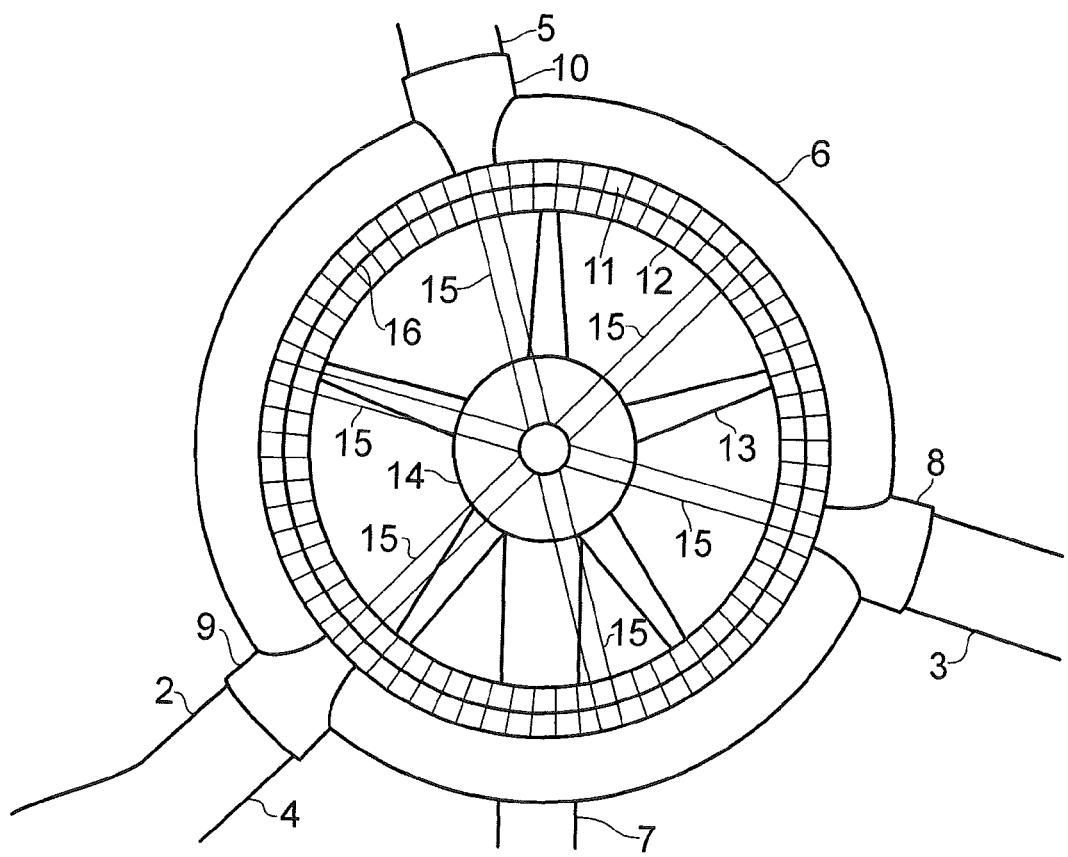
FIG. 2 shows the wind turbine rotor with blades mounted in pitch bearings.
Figure 3:
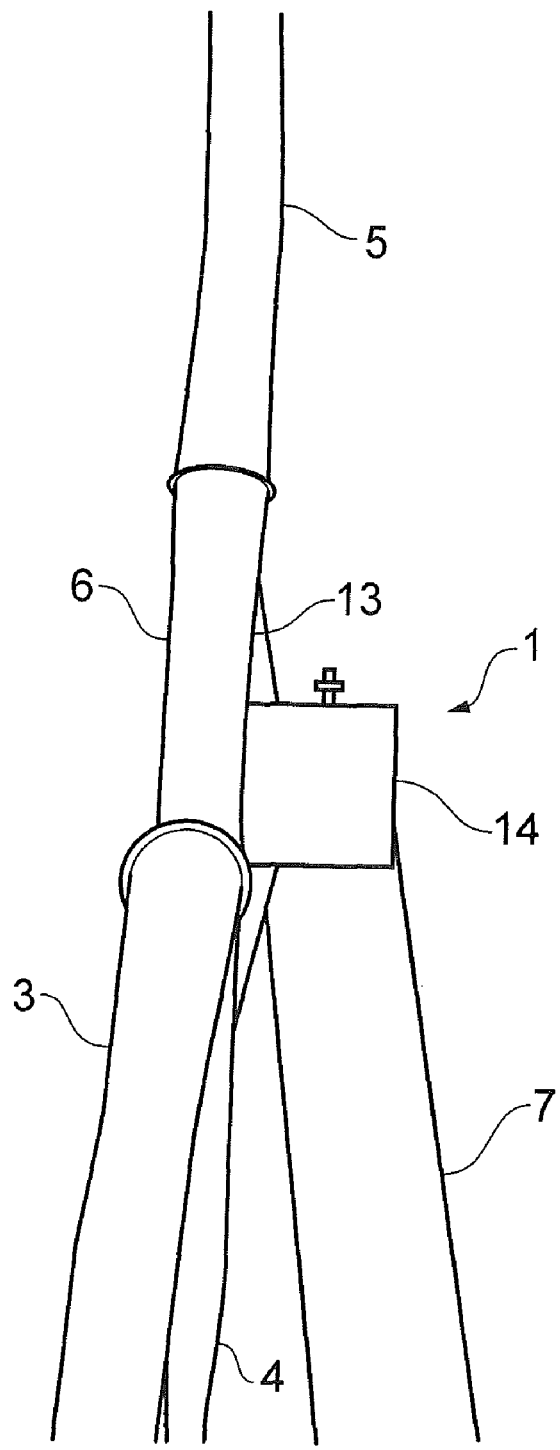
FIG. 3 is a side view of parts of the wind power plant.
Figure 4:
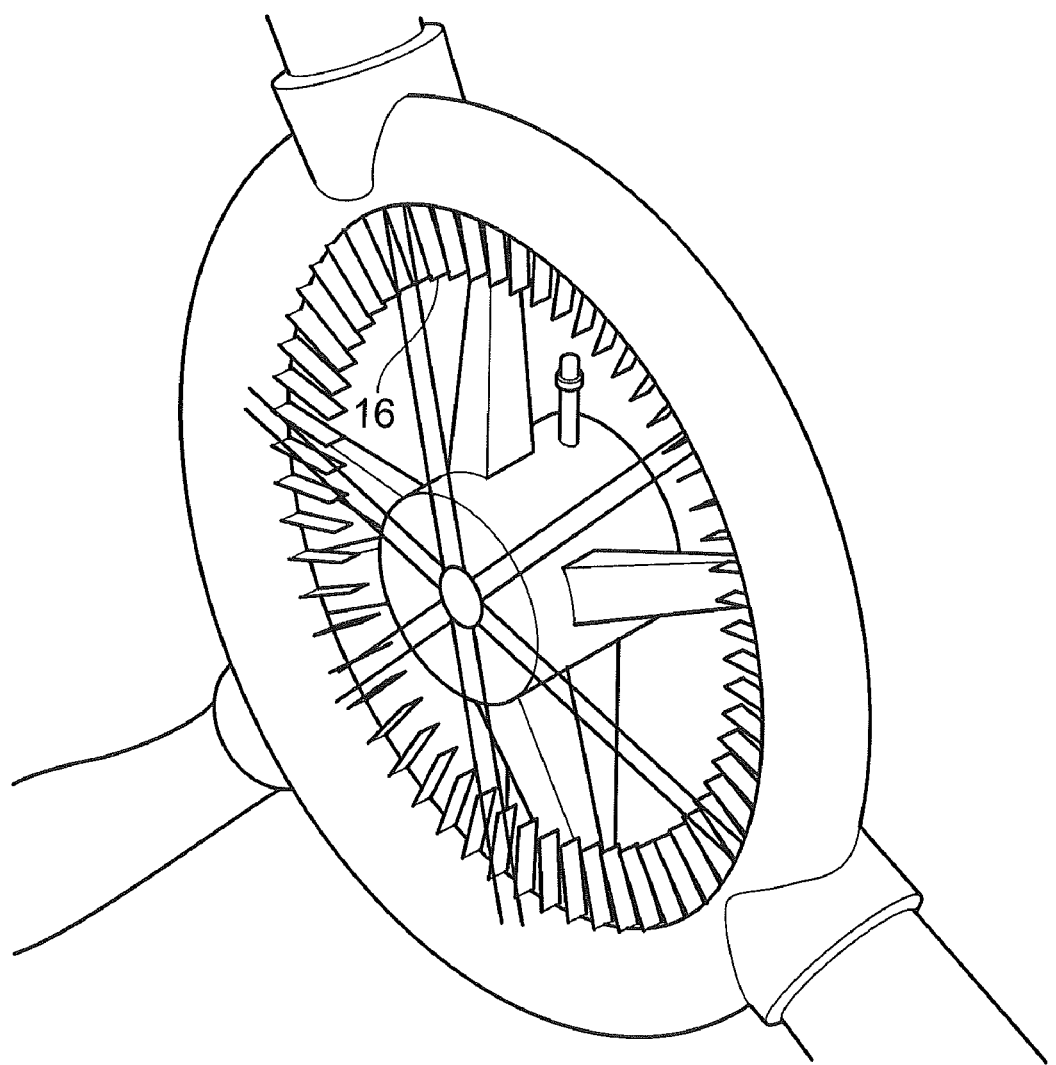
FIG. 4 is a perspective view of parts the wind power plant.
Figure 5:
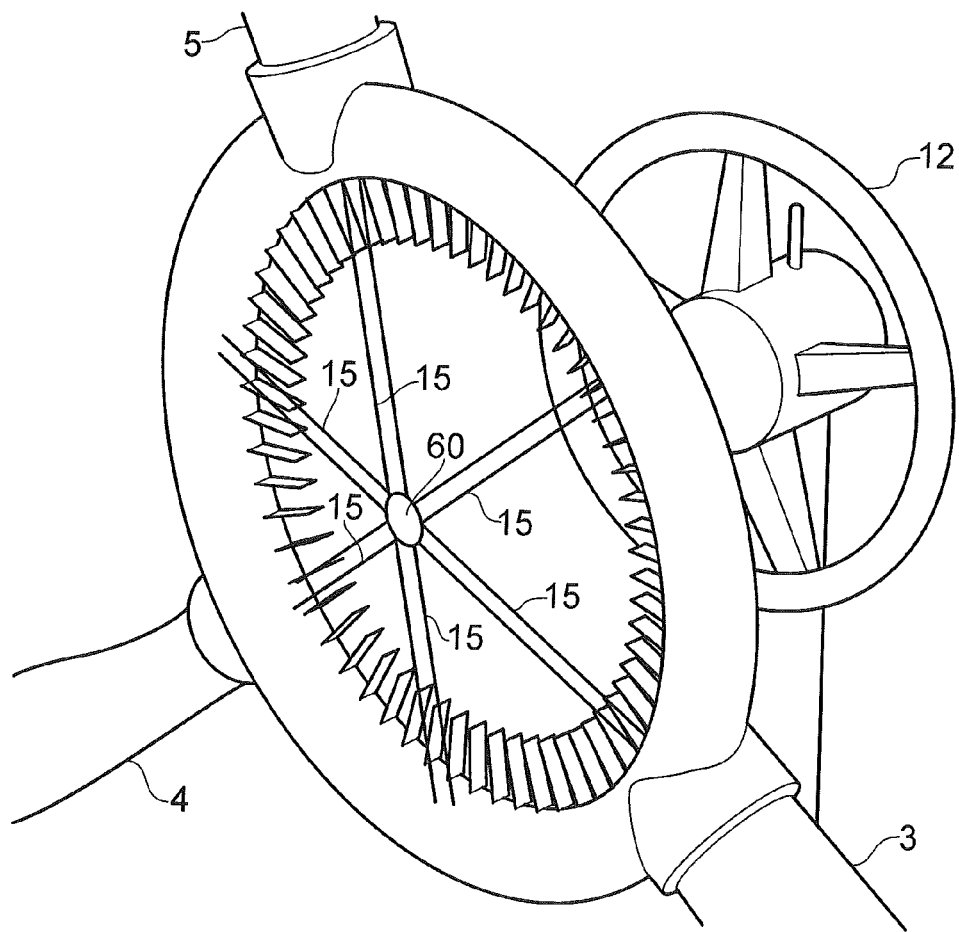
FIG. 5 is a perspective view of a rotor dismantled from a stator.

FIG. 1 shows a wind power plant 1 with an output of 10-12 MW that is equipped with a large ring-shaped hub which forms a ring-shaped hub 6, where ring-shaped hub can have a diameter in the order of 20 metres. The cross-section of the ring-shaped hub 6 can have a diameter in the order of 2 metres. The rotor blades 3, 4, 5 may have a length of 60 m each and are disposed against pitch bearings 8, 9, 10, as shown in FIG. 2, which are arranged to be able to turn the blades about their longitudinal axis on an impulse from a pitch control system (not shown). The pitch bearings are arranged in the ring-shaped hub 6 with an angle of 120 degrees between each bearing. The ring-shaped hub 6 is a closed hollow profile which consists of a hollow circular tube, wherein the circle has a diameter of about 15% of the diameter of the rotor and the tube has a cross-section of about 70% of the cross-section of the blades 3, 4, 5 at their attachment to the pitch bearing. On the inside of the hub there is arranged an electrical rotor 11 which is supported against a stator part 12. The stator 12 is supported by bending-stiff beams 13 which conduct the forces into the rest of the supporting structure via a cylindrical tube 14. The rotor and stator are equipped with naturally ventilated cooling ribs 16.

The load-bearing cross-section of the ring-shaped hub 6 consists of a closed circular hollow profile of about 2 metres in diameter which is adapted to simultaneously take up large torsional moments and bending moments, caused by weight and wind loads on the rotor blades. Stator 12 is supported by bending-stiff beams 13 which conduct the forces into the rest of the supporting structure via a cylindrical tube 14. Each pitch bearing is connected to the opposite side of the ring-shaped hub 6 via tension rods or pressure rods 15, all of which are connected to each other in a central anchor ring or anchor plate 60 which is radially supported mechanically against a cylindrical tube 14. The tension rods or pressure rods 15 lie in one and the same plane so that the tension or pressure rods do not transfer axial forces (unlike a bicycle wheel where the spokes are mounted against the central hub in two different positions axially to be able to take up axial forces). The axial forces from the rotor caused by the wind pressure against the blades 3, 4 and 5 are transferred directly to the stator 12 via an axially aligned magnetic bearing 39 between the ring-shaped hub 6 and the stator 12. This magnetic bearing consists of oppositely directed permanent magnets so that repellent forces arise in the bearing faces. The bearing is advantageously made double-acting, i.e., that it takes up forces in both axial directions. Four rows of magnets may then be used in the bearing in order to achieve this. Alternatively, electromagnets can be used in the bearing. The torque $M_T$ of the turbine rotor which causes energy production is taken up directly in the stator 12 without passing via a central shaft. The fixed shaft 12 is therefore identical with the generator stator and consists of a short annular ring with a large peripheral diameter, adapted to the peripheral diameter of the ring-shaped hub 6, arranged directly against the motor housing 14 or supporting structure 7 of the wind power plant via beams 13. The damping of the rotor 2 and the hub 6 in the rotor plane (defined here as a plane that intersects the outer tip of the three blades) is carried out by active modulation of the generator power output by means of the control system of a power transformer (rectifier/inverter, not shown), optionally together with an aerodynamic brake which provides aerodynamic damping in the rotor plane. Elements from known generator technology with which a person of skill in the art will be familiar, can be used together with this invention without this being described in more detail here. These elements may, e.g., be inclined stator windings or magnets, or an irregular distance between the magnets or the stator windings in order to avoid cogging etc, but are not limited thereto.

Figure 8:
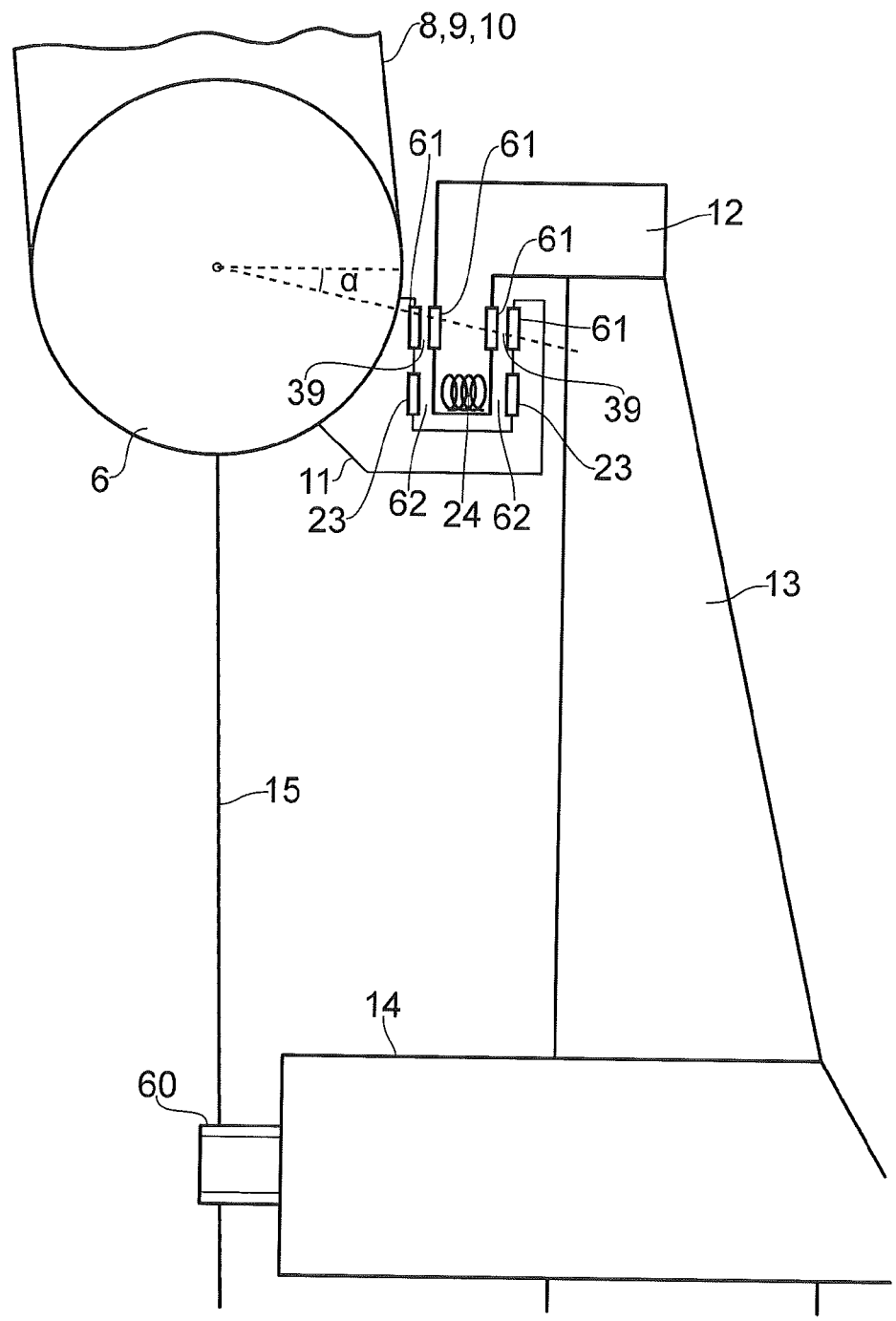
FIG. 8 shows combined axial magnet bearing and radial mechanical bearing.

The main bearing 39 is a stable magnetic bearing consisting of permanent magnets 61 as shown in FIG. 8 which are directed towards each other so that repelling forces are produced between them.

Although the electrical windings in the stator preferably are generally ironless, they may nevertheless alternatively contain iron cores in the areas 21, 22.

If there is a purely magnetic bearing in both the radial and axial direction (with a Halbach array), a mechanical bearing (not shown) can also be provided between the electrical rotor 11 and the stator 12 which supports the electrical rotor both axially and radially until it has reached sufficient speed for the passive magnetic bearing to become active.

The permanent magnets 23 and 61 are fastened against a rubber base in order to provide radial and axial damping in the magnetically stable bearing.

Figure 6:
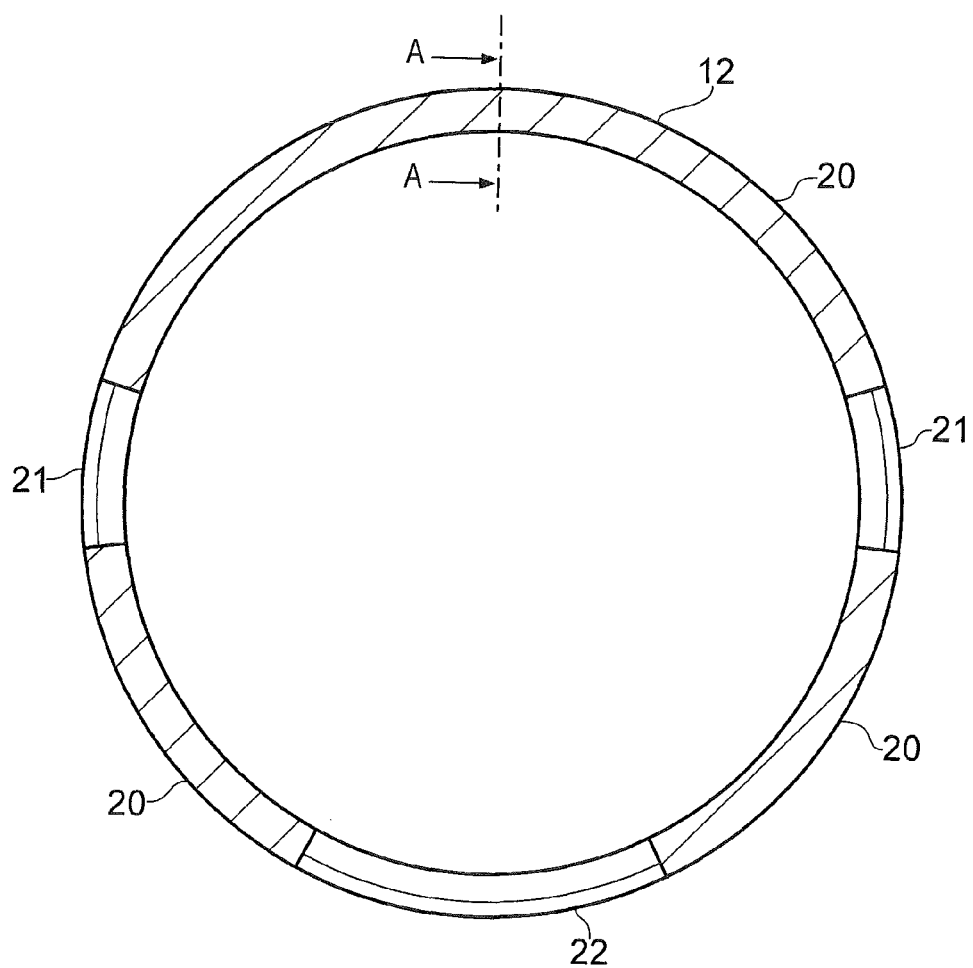
FIG. 6 shows the stator alternatively divided into different areas.
Figure 7A:
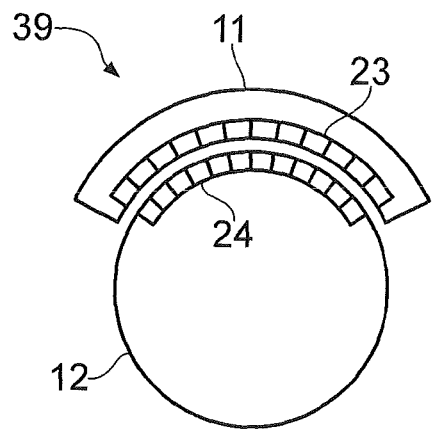
FIGS. 7a, 7b, 7c, 7d show four alternative cross-sections (cross-section A-A as indicated in FIG. 6) of the combined magnetically stable bearing and generator.
Figure 7B:
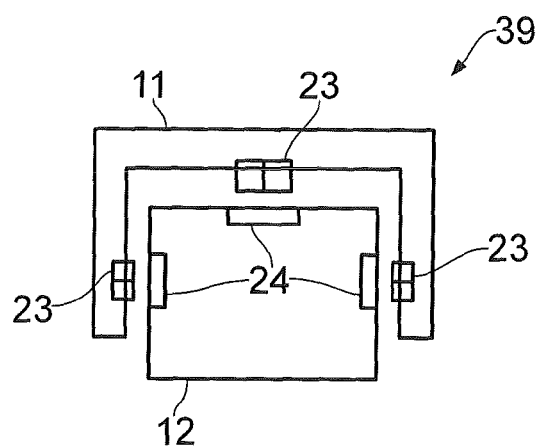
Figure 7C:
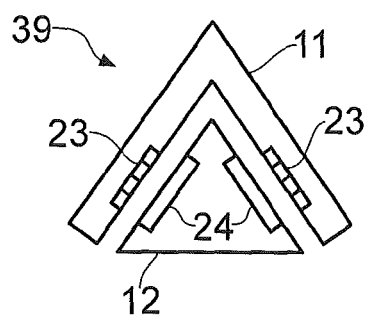
Figure 7D:
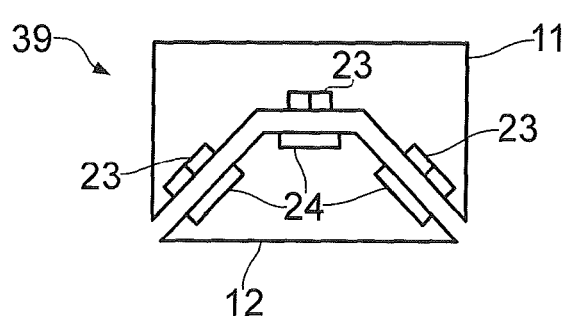

FIG. 8 shows a preferred cross-section (cross-section A-A as indicated in FIG. 6) of the combined magnetically stable bearing and generator consisting of electrical generator 62 composed of stator ring (mounted on rim) 12 with electrical windings 24 without iron cores and permanent magnets 23 on the rotor. The electrical rotor 11 with permanent magnets 23 is a part of and fastened directly to the ring-shaped hub 6.

FIGS. 7a, 7b, 7c and 7d show alternative cross-sections (cross-section A-A as indicated on FIG. 6) of the combined magnetically stable bearing and generator.

Figure 9:
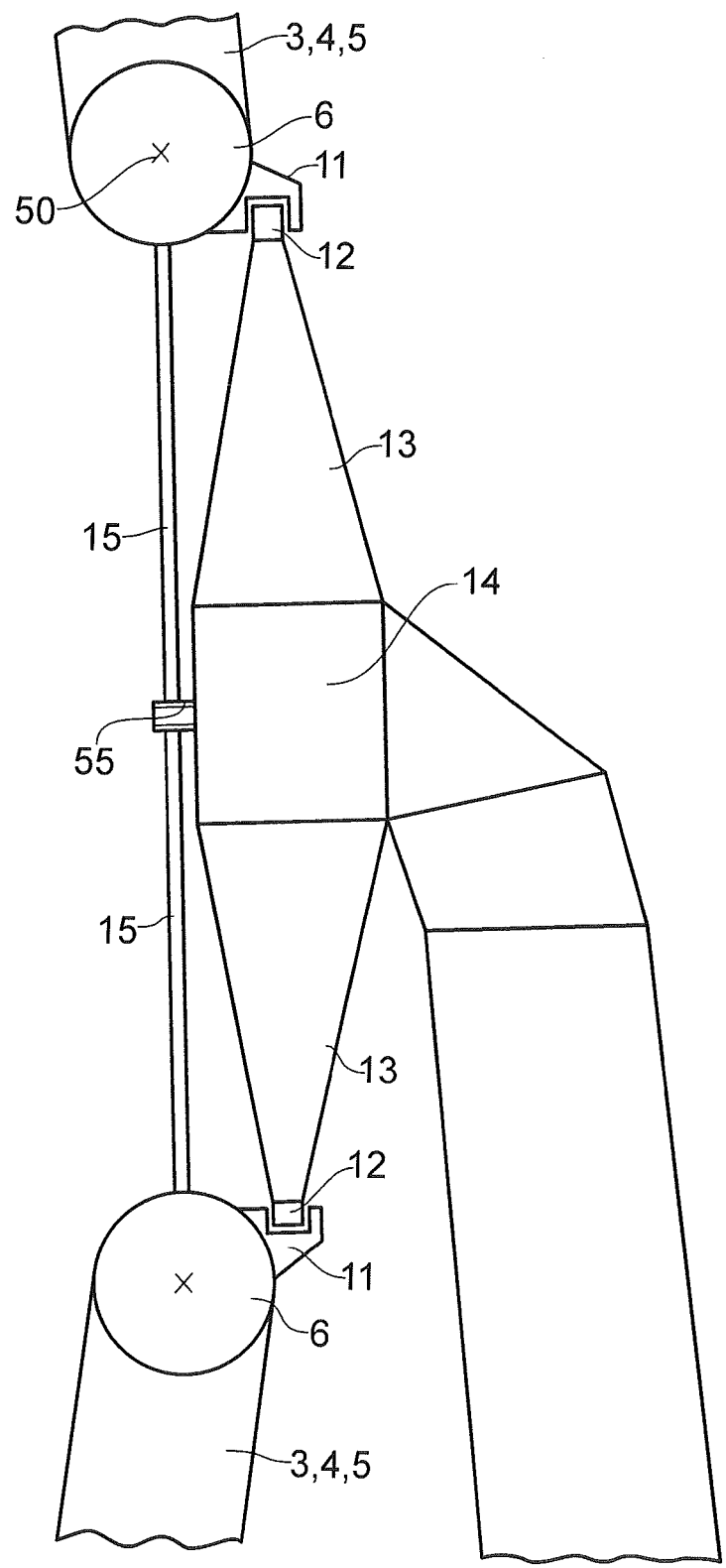
FIG. 9 is a side view of a section of a wind power plant.

FIGS. 8 and 9 are side views of a wind power plant with the ring-shaped hub 6 with the electrical generator 11 arranged on the ring-shaped hub 6. The electrical rotor 11 is attached to the ring-shaped hub 6. The electrical rotor is configured with an annular recess in which the stator 12 lies. This recess may have the form of a U which either points upwards (FIG. 8) or downwards (FIG. 9). To increase available magnetic area, it is also possible to make the generator and the magnetic bearing in the form of several axially successive discs consisting of a plurality of recesses in the axial direction and with a plurality of associated stator rings. The electrical rotor 11 and the stator 12 are provided with magnets which together form a magnetic bearing which takes up axial forces and bending moments caused by wind loads. The electrical generator 11 the stator 12 also comprise the current producing elements, i.e., magnets and stator windings. It is also conceivable that the windings are arranged on the electrical rotor and the magnets on the stator. The annular recess in the electrical rotor 11 and the stator 12 may have different designs, for example as shown in FIGS. 7a-d and FIG. 8.

To take up radial forces, in particular the weight of the turbine rotor, there are provided tension or pressure rods 15 which are fastened to the ring-shaped hub 6 at one end and to a central anchor ring or anchor plate 55 at the other end, wherein the anchor ring or anchor plate 55 is radially supported mechanically against a cylindrical tube 14.

On the ring-shaped hub, the turbine rotor blades 3, 4, 5 are also mounted on their respective pitch bearings.

Figure 10:
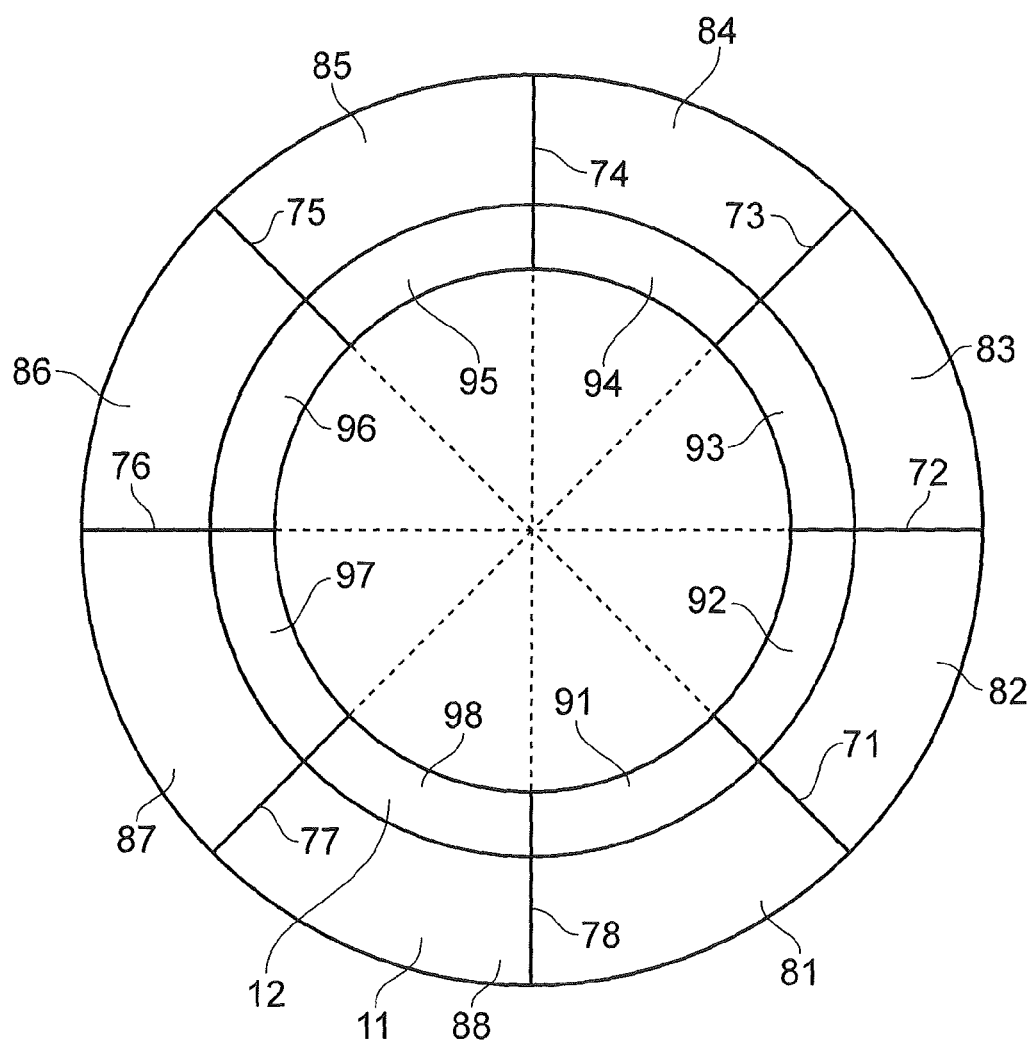
FIG. 10 is an outline of how an assembly can be sectioned during production.
Figure 11:
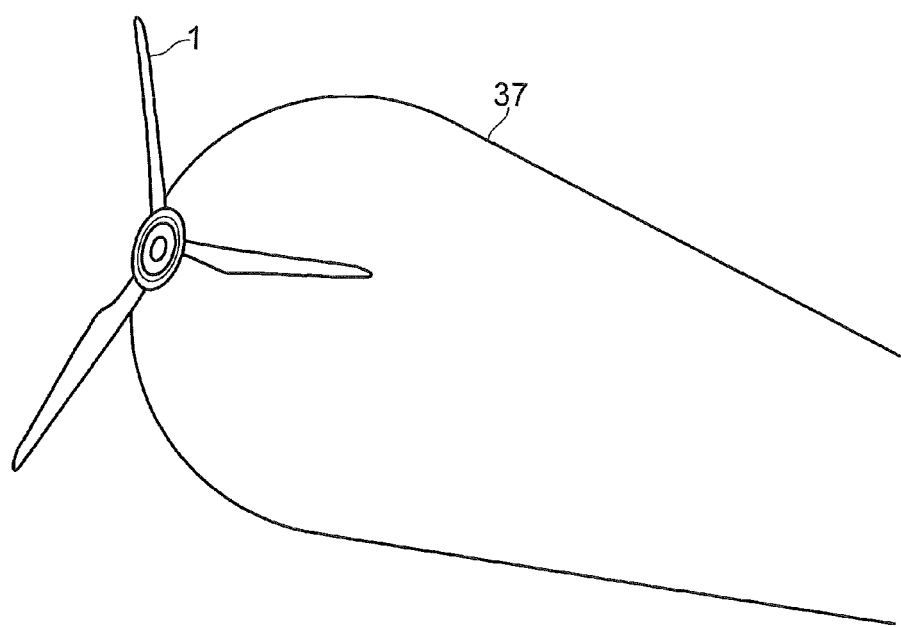
FIG. 11 shows an arrangement where the wind power plant is used as a propulsion system for a vessel in air or water.
Figure 12:
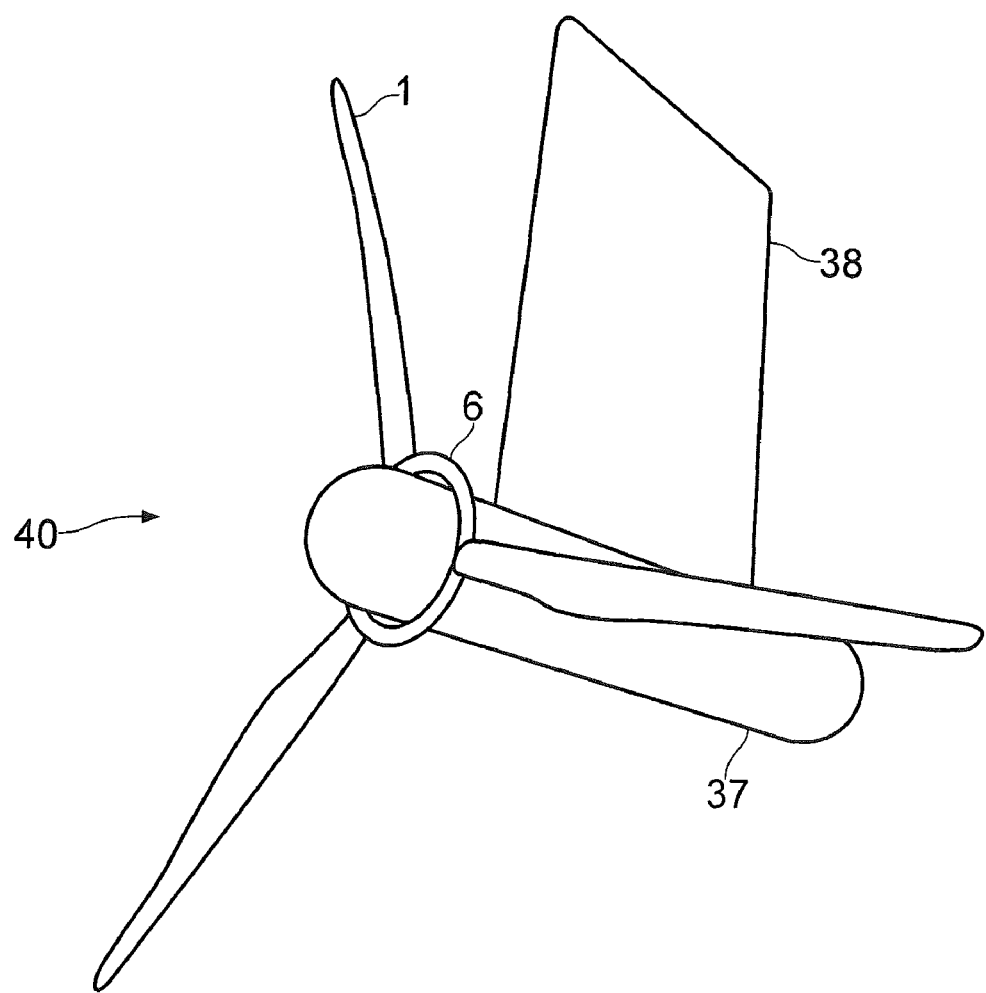
FIG. 12 shows a propulsion system where the hub surrounds a part of or the whole of the vessel's hull.

FIG. 10 shows purely schematically how the electrical rotor 11 and stator 12 can be put together in assembled sections before they are mounted into one unit, the assembled sections being mounted on the ring-shaped hub 6 first and then on the stator beams 13, or on the stator beams 13 first and then on the ring-shaped hub 6. In the figure, the electrical rotor 11 and the stator 12 are shown assembled into one unit. During production, the electrical rotor 11 and the stator 12 are sectioned into a number of sections. In the figure it is indicated by the lines 71, 72, 73, 74, 75, 76, 77, 78 that the electrical rotor 11 and the stator 12 are divided into 8 sections. Owing to the strong magnetic forces that will be produced between the bearing magnets in the stator sections 91, 92, 93, 94, 95, 96, 97, 98 and the corresponding bearing magnets in the rotor sections 81, 82, 83, 84, 85, 86, 87, 88, sectioning is a good solution to be able to handle these forces more easily. When the sections have been assembled and held together by temporary transport fastening, they are transported separately to the installation site of the wind power plant and assembled there against the hub 6 into one unit.

The sectioning of the electrical rotor 11 and the stator 12 also make it easier to ensure that the electrical rotor and the stator form a planar unit when they are mounted on the ring-shaped hub 6 and the stator beams 13. As the sections are mounted, for example first to the ring-shaped hub 6, a new section will be adjusted by using shims so that it is plane with the sections that have already been mounted. When the ring-shaped hub 6 and the sections have been mounted in a perfect or near perfect plane, the ring-shaped hub and the sections, which now constitute one unit, are mounted to the stator beams 13. It must then again be ensured that the assembled unit of sections is held in a perfect or near perfect plane during its mounting to the stator beams 13 by evening out irregularities using shims. Building tolerances for hub and stator beams with their large dimensions are thus uncritical. During operation, the turbine rotor will thus rotate about the stator with strongly reduced danger of the stator and the electrical rotor coming into physical contact.

The invention can also be used as a propulsion system for aircraft and all types of craft and boats that are in water. The turbine rotor 2 with the ring-shaped hub 6, pitch bearings 8, 9, 10 and magnetic bearing 39 in this instance of the invention will be arranged as a propeller. The size, strength and torsion/gradient etc. of the propeller are altered according to the prior art for this purpose. The generator is then run as an electric motor. The propulsion system is arranged on a vessel 37 which is to be moved by means of the propulsion system, where two examples are shown in FIGS. 14 and 15. On the vessel 37 or the hull, in one variant of the invention, a streamlined connection can be mounted to possible other parts of the object/hull that is to be moved. In another variant of the invention, the propulsion system 40 is arranged with a rudder (not shown). In yet another variant of the invention, the propulsion system 40 is arranged so that the propulsion system itself can be turned about the vertical axis in a rotatable attachment to the vessel as an azimuth propeller. Many other configurations for mounting a propeller according to the prior art will be possible. The propeller may have fewer or more blades than the preferred embodiment illustrated here. The vessel 37 may also be provided with several propellers.

The invention claimed is:

1. A turbine rotor for a wind power plant or hydro power plant or for propulsive means for a vessel, the turbine rotor comprising a rigid ring-shaped hub with an axis of rotation, the rigid ring-shaped hub, in a side view cross-section, being configured as a closed, hollow profile, the ring-shaped hub further being configured as a torus with a circular cross section or a torus with a polygonal cross section, wherein a section through the ring-shaped hub perpendicular to said axis of rotation is ring-shaped, the outer and the inner circumferences of the ring being circular or polygonal, and wherein the turbine rotor further comprises at least one elongated, rigid rotor blade which is arranged on the ring-shaped hub on the opposite side of the ring-shaped hub relative to said axis of rotation.

2. A turbine rotor according to claim 1, wherein the side view cross sectional diameter of the ring-shaped hub is of substantially the same size as the diameter of the at least one blade at the point of attachment of the blade.

3. A turbine rotor according to claim 1, wherein the generator rotor is mounted to the ring-shaped hub.

4. A turbine rotor according to claim 1, wherein the distance from the axis of rotation of the turbine rotor to the outer circumference of the ring-shaped hub around the axis of rotation of the turbine rotor is at least 1/12 of the radius of the turbine rotor from the axis of rotation to a blade tip.

5. A turbine rotor according to one of the claims 1-4, wherein the wind turbine rotor comprises at least two tension rods which at their first ends are attached to a bearing that is coaxial with the centre axis of the stator and at their second ends are fastened to the ring-shaped hub.

6. A turbine rotor according to claim 5, wherein that the tension rods lie in one and the same plane.

7. A turbine rotor according to one of the claims 1-4, wherein the wind turbine rotor comprises at least two pressure rods which at their first ends are fastened to a bearing that is coaxial with the centre axis of the stator and at their second ends are fastened to the ring-shaped hub.

8. A turbine rotor according to claim 7, wherein the pressure rods lie in one and the same plane.

9. Wind power plant or hydro power plant, or a vessel, wherein the wind or hydro power plant or the vessel comprises a turbine rotor according to claim 1.

10. A power plant comprising a direct-drive generator for converting the energy in wind or flowing water into electrical energy, the power plant comprising a tower structure and a turbine rotor, the direct-drive generator comprising a generator rotor, a stator which is mounted on the tower structure and a bearing supporting the turbine rotor on the stator, wherein the turbine rotor is formed according to claim 1 and wherein said bearing and said generator rotor are mounted on the rigid ring-shaped hub of the turbine rotor, the turbine rotor having an axis of rotation that coincides with the centre axis of the stator of the direct-drive generator.

11. A power plant according to claim 10, wherein the turbine rotor is supported on the stator by a magnetic bearing consisting of either permanent magnets, electromagnets or a combination of both.

12. A power plant according to claim 11, wherein the magnetic bearing is a passive magnetic bearing.

13. A power plant according to claim 11, wherein the magnetic bearing is a passive magnetic bearing with the magnets arranged in a Halbach array.

14. A power plant according to one of the claim 11, wherein the magnets in the stator are replaced by short-circuited electrical conductors.

15. A power plant according to one of the claim 13, wherein the magnets in the stator are replaced by short-circuited electrical conductors.

16. A power plant according to claim 11, wherein the magnetic bearing is an electromagnetic bearing.

17. A power plant according to claim 11, wherein current-producing windings are installed without magnetically conducting iron cores.

18. A power plant according to claim 17, wherein the generator magnets consist of permanent magnets arranged in a Halbach array.

19. A power plant according to claim 10, wherein the turbine rotor is supported on the stator by a conventional bearing.

20. A power plant according to claim 10, wherein the turbine rotor is supported by a magnetic bearing axially against the stator and that the turbine rotor is supported radially by a conventional bearing.

21. A power plant according to one of the claims 11-18, wherein the shortest distance from the axis of rotation of the ring-shaped hub to the area centre of the force transferring face of the magnetic bearing is smaller than the distance from the axis of rotation of the ring-shaped hub to the neutral axis of the side view cross-section of the ring-shaped hub.

22. A power plant according to one of the claims 11-20, wherein the bending stiffness of the ring-shaped hub for bending out of a plane that passes through the ring-shaped hub and is perpendicular to the axis of rotation of the ring-shaped hub is greater than the bending stiffness of the stator for bending out of the same plane.

23. A power plant according to one of the claims 11-20, wherein the bending stiffness of the ring-shaped hub for bending out of a plane that runs through the ring-shaped hub and is perpendicular to the axis or rotation of the ring-shaped hub is at least twice as great as the bending stiffness of the stator for bending out of the same plane.

24. A wind power plant comprising a
   turbine rotor comprising a ring-shaped hub with an axis of rotation,
   at least one rotor blade which is arranged on the ring-shaped hub on the opposite side of the ring-shaped hub relative to said axis of rotation
   a tower structure,
   a direct drive generator comprising a generator rotor and a stator, the stator being mounted on the tower structure,
   wherein the ring-shaped hub is configured as a torus with a closed hollow profile, the generator rotor is mounted on the ring-shaped hub and wherein the turbine rotor and the generator rotor are supported on the stator such that axial forces caused by wind pressure are transferred to the stator.

25. A wind power plant according to claim 24, wherein the stator is supported by bending stiff beams which conduct said forces into the rest of the supporting tower structure.

26. A wind power plant according to claim 24, wherein the stator comprises a short annular ring with a peripheral diameter which is adapted to a peripheral diameter of the ring-shaped hub.

27. A wind power plant according to claim 24, wherein there is arranged a spoke system between the ring-shaped hub and a mechanical bearing arranged against the tower structure.

28. A wind power plant according to claim 24, wherein the wind power plant further comprises a magnetic bearing between the ring-shaped hub and the stator.

* * * * *